United States Patent [19]

Abraham

[11] Patent Number: 5,351,272
[45] Date of Patent: Sep. 27, 1994

[54] COMMUNICATIONS APPARATUS AND METHOD FOR TRANSMITTING AND RECEIVING MULTIPLE MODULATED SIGNALS OVER ELECTRICAL LINES

[76] Inventor: Karoly C. Abraham, 506 S. 41st St., Apartment 3E, Philadelphia, Pa. 19104

[21] Appl. No.: 884,123

[22] Filed: May 18, 1992

[51] Int. Cl.5 .................. H04K 1/10; H04L 27/28; H04M 11/04
[52] U.S. Cl. .................. 375/38; 340/310 A; 340/310 R
[58] Field of Search ............ 340/310 R, 310 A, 825, 340/58, 310 CP; 375/7, 8, 9, 52, 53, 54, 83, 85, 37, 38, 39; 455/14

[56] References Cited

U.S. PATENT DOCUMENTS

| | | |
|---|---|---|
| 2,125,119 | 7/1938 | Lyman . |
| 4,004,110 | 1/1977 | Whyte . |
| 4,142,178 | 2/1979 | Whyte . |
| 4,254,402 | 3/1981 | Perkins . |
| 4,355,303 | 10/1982 | Phillips et al. ........... 340/310 A |
| 4,419,758 | 12/1983 | Dorey ........................ 375/38 |
| 4,675,648 | 6/1987 | Roth et al. . |
| 4,800,363 | 1/1989 | Braun et al. . |
| 4,815,106 | 3/1989 | Propp et al. ............. 340/310 R |
| 4,845,466 | 7/1989 | Hariton et al. . |
| 4,885,563 | 12/1989 | Johnson et al. . |
| 4,903,006 | 2/1990 | Boomgaard . |
| 5,185,591 | 2/1993 | Shuey ........................ 340/310 R |

OTHER PUBLICATIONS

J. Bingham, "Multicarrier Modulation for Data Transmission: An Idea Whose Time has Come," IEEE Communications Magazine, May 1990, pp. 5–14.
Keith Nichols, "Build a Pair of Line-Carrier Modems," *Radio Electronics*, pp. 87–91 (Jul. 1988).
J. Gohari, "Power-Line Carrier," *Fundamental Handbook of Electrical and Computer Engineering, vol. II: Communications Control Devices and Systems*, pp. 617–627 (1983).

Primary Examiner—Stephen Chin
Assistant Examiner—Duane Kobayashi
Attorney, Agent, or Firm—Ratner & Prestia

[57] ABSTRACT

The present invention discloses an improved electrical communication apparatus which communicates high speed data/information over existing AC wiring, provides a phase linear environment for electrical transmission and reception of information on electrical wiring and provides a means for simultaneous transmission and reception of multiple data/information streams via the use of dielectric core couplers. This invention provides a means for linking 2 or more microprocessor based or electronic devices via conventional electric lines such as power lines, building wiring, twisted pair, coaxial cable or other wiring.

31 Claims, 8 Drawing Sheets

COMMUNICATIONS APPARATUS AND METHOD FOR TRANSMITTING AND RECEIVING MULTIPLE MODULATED SIGNALS OVER ELECTRICAL LINES

FIELD OF THE INVENTION

The present invention relates to communication apparatus used to send and receive high speed data over electrical lines. More specifically, it provides a means for high speed data to be sent and received over conventional electrical wiring or other electrical lines already existing in a building or over preexisting power lines between buildings and structures.

DESCRIPTION OF THE PRIOR ART

Presently, there are a number of devices that allow different types of information to be sent over electrical lines. For example, there are intercom, stereo, switch control, and line carrier modem systems which readily plug into an electrical outlet and allow transfer of information over conventional wiring to any other outlet in the same building.

The term conventional wiring includes wiring found in buildings, homes or other structures. Conventional wiring can be AC power lines, electrical wiring, coaxial, twisted pair, telephone, antenna, multibase or any other wiring that can carry electricity.

Intercom systems transfer a frequency modulated voice signal over an electrical AC line which is received at another point or socket on the electrical line and is demodulated back into its voice components. Switch control systems consist of a main switch control station plugged into an electrical outlet as well as multiple receiving stations plugged into other electrical outlets. Each of the receiving stations may have a lamp or other appliance plugged into it. The main switch control station allows the user to press a selected button which switches a selected appliance on or off at a receiving station. The information sent from the switch control station to the receiving station is generally a frequency modulated on top of the AC voltage already present in the conventional electrical wiring. The frequency is received by the individual receiving stations. Each receiving station listens for a particular frequency which indicates whether to switch to the off or on position. Here only the simplest of information is sent over the conventional wiring.

There are also line carrier modems. A line carrier modem, such as one described in, Keith Nichols, "Build a Pair of Line-Carrier Modems," *Radio Electronics*, 87–91, (July 1988), is connected to a computer or personal computer and then plugged into an electrical outlet. Somewhere else on the same electrical line another computer is connected to one of the line carrier modems and also plugged into an electrical outlet. Data can be communicated from one computer to another via the line carrier modems. Generally, such modems, take a single data stream from the computer, modulate the data stream, then place it on top of the AC voltage present in the conventional wall wiring. This signal is then received by a second line carrier modem and demodulated back into the original data stream so that the second computer can receive the data from the first computer.

Existing line carrier modems are limited to a baud rate of 19.2 kbaud or less. This limitation is mainly due to the use of magnetic or iron core transformers in their design. These iron core transformers are used to couple the modulated data stream from the line carrier modem onto and off of the conventional wiring. These magnetic core couplers are not impedance matched to the electrical line characteristic impedance, and thus distort the modulated signal. This distortion limits the transmission and reception baud rate to 19.2 kbaud. Spread spectrum techniques are used in existing line carrier modems due to the problem encountered with standing waves. A standing wave occurs due to the mismatched impedance of the magnetic core couplers and the electrical line which causes a reactive coupling at carrier frequency. The standing wave will cause null points on the conventional wiring; the effect of which will cancel the transmission at the null point. Existing transmission or receiving line carrier modems, with their iron core or magnetic core transformers, are inept at filtering out a majority of the 60 Hz harmonics from a 60 Hz 120 volt electrical line. Iron core or magnetic core transformers/couplers are also phase non-linear, thus modulated signals sent along conventional wiring are of a different phase when received then as when transmitted. This unpredictable phase shift, associated with the coupling of the modulated signal to the electrical line, severely limits the use of encoding digital data with phase shift keying techniques.

At present, local area networks (LANs) and networking systems, such as Ethernet, are the industry choice for connecting multiple computer stations together. These networks generally consist of multiple computer stations, a network server, and a hard wired bus and/or electrical lines connecting every computer system. Each computer or station on the system has an address known by all the other computers or stations. For a first station to communicate with a second station it merely sends the address of the second station on the bus followed by pertinent data information. The information is received by a second station with the proper address. The second station may transmit data back to the first station using the same process.

LAN or Ethernet systems are expensive to install. One reason for the expense is the purchasing and installation costs of wiring an office complex. Wiring often must be installed underneath the floors or through the walls in order to meet building codes. At a later date, the installation of more wiring may be required to expand the system.

Local area networks and Ethernets transmit data over their communication lines at an extremely high rate of speed. This rate of speed can be up to and greater than 10 Mbaud on coaxial line and about 1 Mbaud over multiple twisted pair. At present, there is no available system that allows LAN or Ethernet expansion without hard wiring additional cabling throughout an office building. As mentioned earlier, existing line carrier modems can only transmit and receive data at about 19.2 kbaud. They are not useful for expanding Ethernet or LAN systems because linking a pre-existing LAN System to presently existing line carrier modems for expansion purposes will slow the entire network down or make the system inoperable.

SUMMARY OF THE INVENTION

The invention includes communication apparatus which transmits and receives multiple modulated signals over an electrical line having a first station capable of receiving high speed data and converting the high speed data into multiple modulated signals for sending simultaneously over the electrical line to said second station. The second station is capable of simultaneously demodulating the multiple modulated signals and converting the signals back into high speed data; and each of the stations incorporates dielectric core couplers for coupling the multiple modulated signals between the electrical line and each station.

In light of all the foregoing, it is a primary object of the present invention to transmit and receive data at baud rates greatly exceeding 19.2 kbaud over preexisting conventional wiring.

It is a further object of the present invention to transmit and receive data over conventional wiring in a phase linear fashion such that phase shift keying techniques can be used in sending and receiving digital data.

It is another object of the present invention to resistively match a Power Line Coupler Modem to the electrical wiring characteristic impedance at the transmission frequency in order to eliminate standing waves. The elimination of standing waves will allow the Power Line Coupler Modem to transmit and receive without using spread spectrum modulation/demodulation techniques.

It is another object of the present invention to send and receive multiple modulated signals at the same time over conventional wiring.

It is yet another object of the present invention to provide an inexpensive means for installing and expanding LAN or networking systems such as Ethernet or Token Ring, etc.

It is an additional object of the present invention to allow multiple computers or stations to communicate via pre-existing electrical lines found within a building.

It is a further object of the present invention to allow computer systems to communicate via pre-existing power lines between buildings such that work stations or computer systems in one building can communicate with multiple work stations and/or computer systems in other buildings.

It is another object of the present invention to transmit and receive clear audio or video analog signals via conventional wiring in a phase linear manner.

DETAILED DESCRIPTION OF THE INVENTION

The present invention, a Power Line Coupler Modem (PLCM), provides a means for high speed data communication over conventional wiring. The invention modulates multiple signals at different preselected modulation frequencies, then combines and sends the multiple modulated signals over conventional wiring. The multiple modulated signals are then received, separated and individually demodulated. Power Line Couplers, described in my pending patent application Ser. No. 822,326, are used in the present invention to place and retrieve the multiple modulated signals onto and off of the conventional wiring. These couplers are phase linear at and close to their preselected frequencies and are capable of removing a majority of the AC harmonics associated with power line frequencies (60 Hz) found on conventional wiring. Furthermore, operation of the PLCM can reach speeds in excess of 1 MBaud (with four to ten couplers) for 3 KM distances. It is emphasized that the transmission is in a parallel form rather than a serial form.

Figure 1:
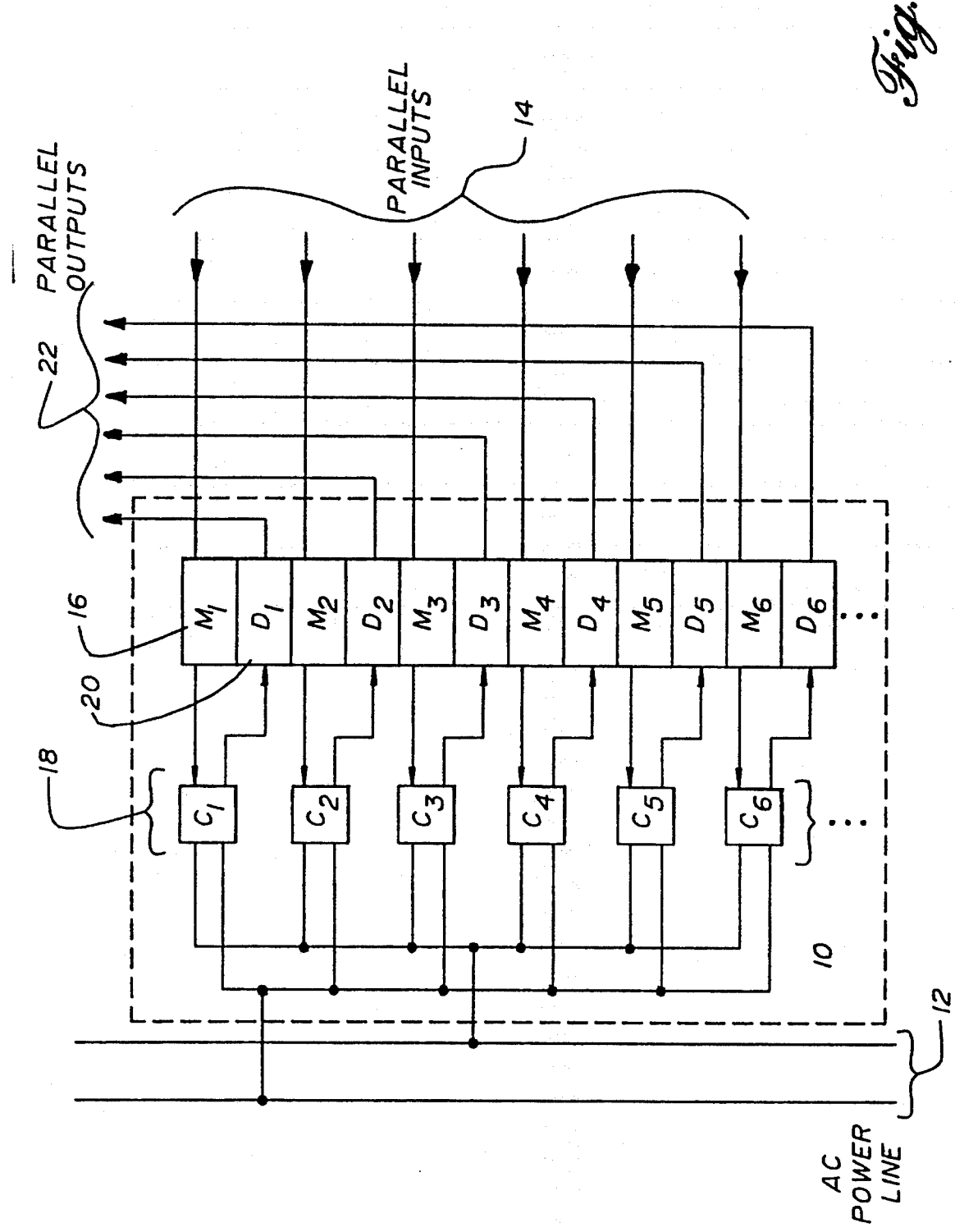
FIG. 1 is a block diagram of basic Power Line Carrier Modem (PLCM) of the present invention.

FIG. 1 depicts a basic Power Line Coupler Modem (PLCM) 10 which consists of at least two Power Line Couplers ($C_1$-$C_n$) 18 plus an equal number of modulators ($M_1$-$M_n$) 16 and demodulators ($D_1$-$D_n$) 20. Data, usually in the form of a digital bit stream, comes from a device capable of sending parallel digital data (not shown), such as a personal computer or microprocessor based device. It should be noted that the data could be analog information such as voice, video, stereo, or other analog signals.

Data enters the PLCM 10 via the parallel inputs 14. The data is modulated to a preselected modulation frequency by its associated modulator ($M_1$-$M_n$) 16. After each data stream is modulated at the modulators it is passed to its associated coupler ($C_1$-$C_n$) or Power Line Carrier (PLC) 18. Each coupler 18 is phase linear and resistively matched at or around the modulation (carrier) frequency to the characteristic impedance of the AC power line 12 to which it is connected. Each coupler ($C_1$-$C_n$) 18 is connected to one another resulting in an addition of all the modulated data streams as they are connected to the conventional wiring or AC power line 12.

Figure 8:
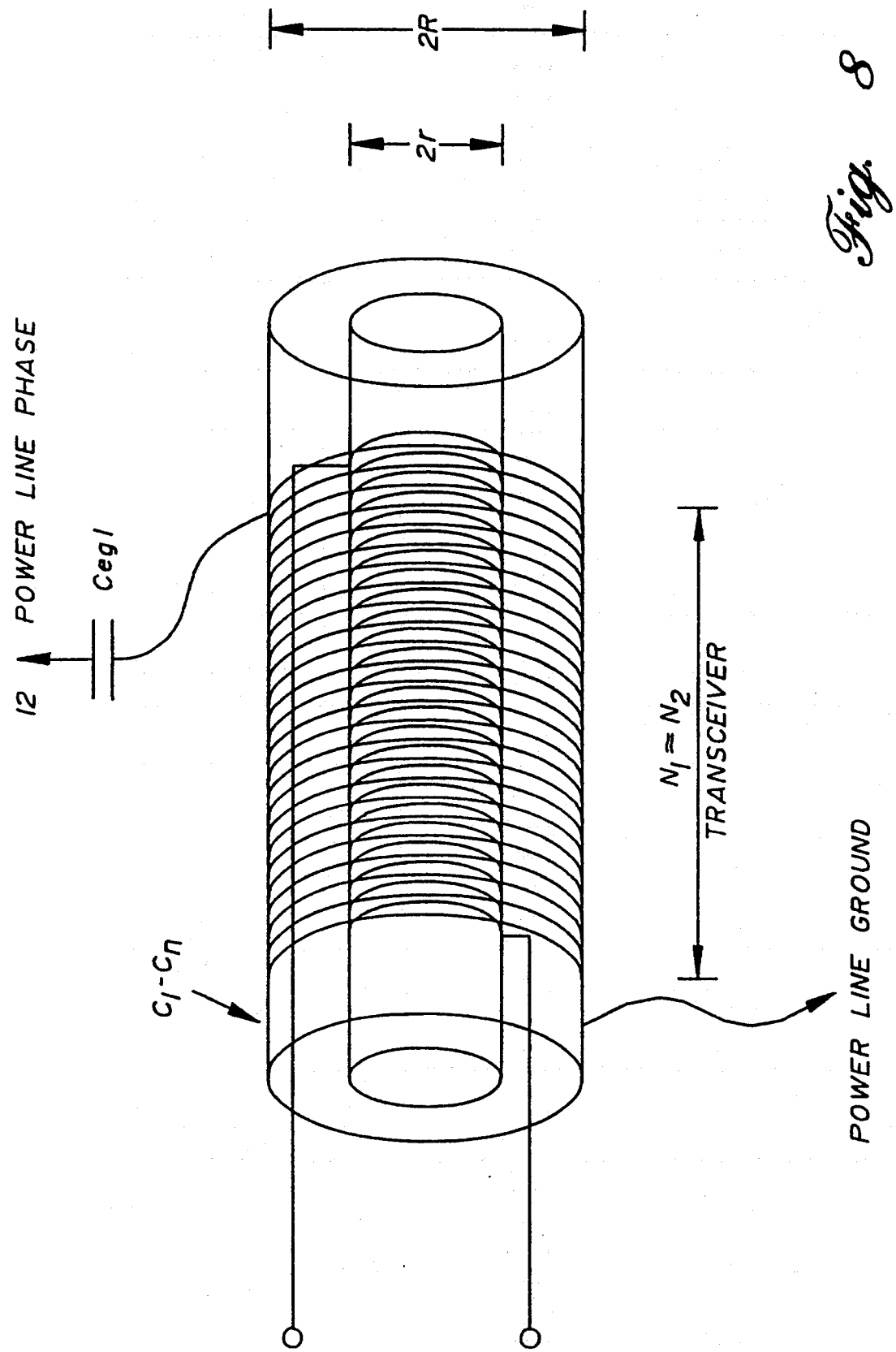
FIG. 8 depicts the coupling transformer of a power line coupler of the present invention.

A second PLCM, shown in FIG. 1, is identical to the first PLCM 10. The addition of all the modulated data streams enters the second PLCM 10 from the AC power line 12. The couplers of FIG. 8 ($C_1$-$C_n$) 18 are impedance matched to the AC power line 12 and phase linear at the preselected filter frequencies. Each coupler filters the incoming signal and extracts a single preselected modulated data stream. The modulated data stream is sent from the couplers ($C_1$-$C_n$) 18 to an associated demodulator ($D_1$-$D_n$) 16. Each demodulator 16 removes the modulating carrier signal from the data leaving the data which was sent by the first PLCM. This data is placed onto its associated parallel output lines. The output lines carry the data to an electronic device capable of receiving parallel digital data such as a computer, printer, or other electronic device.

This entire communication process can be repeated in the opposite direction. That is, the second PLCM can send data to the first PLCM via the AC power line 12. The generic data rate at which the parallel input 14 and output 22 lines are capable of operating at is in the range of 50 to 100 KSymbols/sec for each line. The PLCM can be configured to handle any size parallel bus and the signals on the bus can be anything from DC voltage levels to binary signals to multiple analog signals.

The maximum communication distance is calculated from the raw speed of each digital bit stream. Dividing the speed of an electron, 300,000 km/sec, by the speed of the bit stream, 100 KSymbols/sec, we get 3 km/bit. Normally only a fraction of the 300,000 km/sec can be assumed for electron speed, thus the maximum communication distance will be closer to 2 km.

Figure 2:
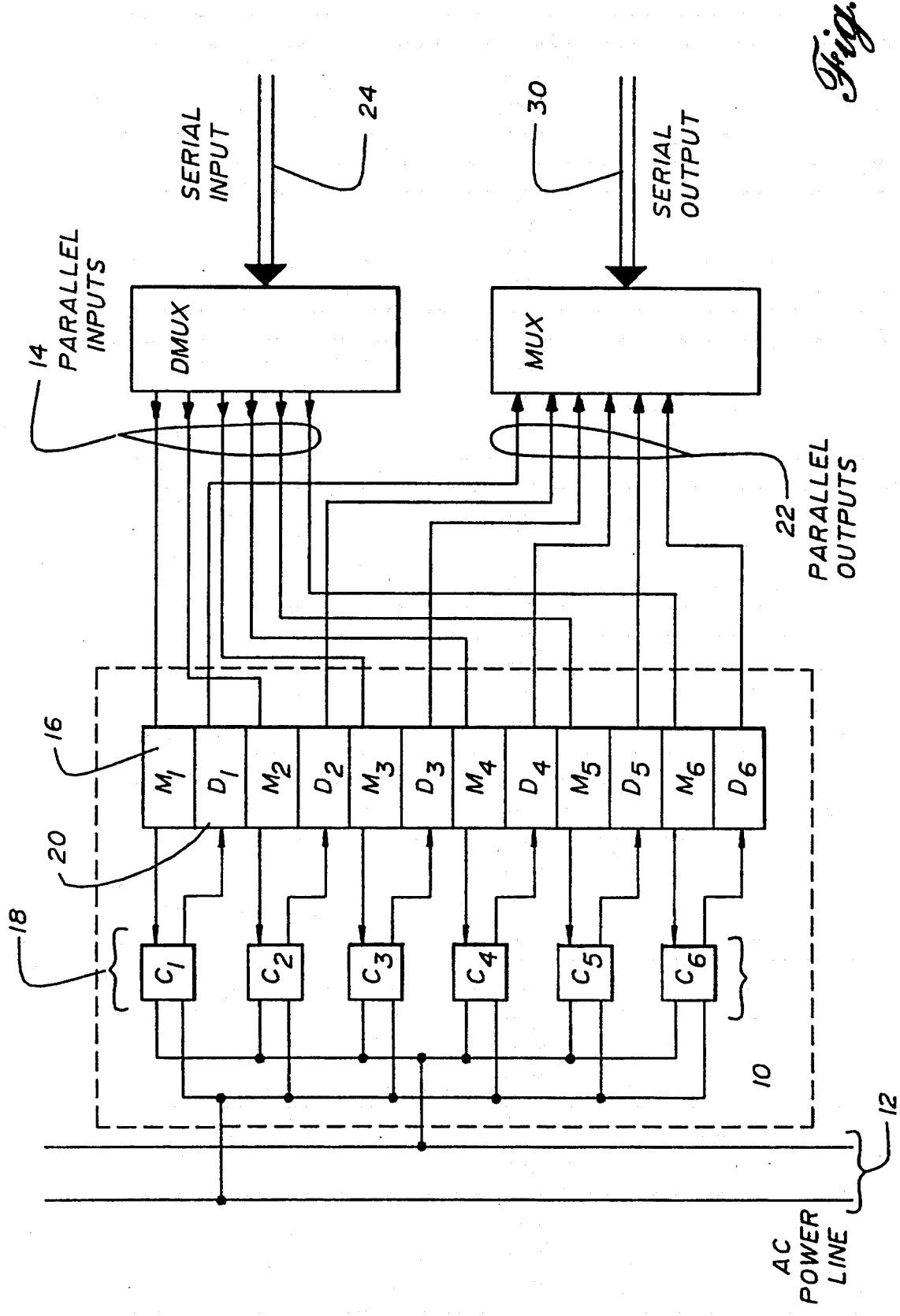
FIG. 2 is a block diagram of the PLCM organized to handle serial inputs and outputs.

FIG. 2 depicts the basic PLCM 10 wherein the parallel inputs 14 are connected to a demultiplexer 26 and the parallel outputs are connected to a multiplexer 28. In this configuration the PLCM 10 can receive serial or parallel (herein "data stream) data stream on the input line 24 from a device capable of sending a data stream (not shown). The demultiplexer 26 receives the data stream and converts it to parallel data for the parallel input lines. The PLCM then operates as described above. In short, each signal on the parallel input line is modulated, then coupled to the AC power line. The signal is then received by a second PLCM wherein the modulated signals are coupled to the PLCM, separated, filtered, demodulated and sent out on the parallel output lines 22.

The parallel output lines 22 are connected to a multiplexer which converts the parallel data back to its original data stream. This data stream can be received by an electronic device designed to receive serial or parallel data.

Figure 7:
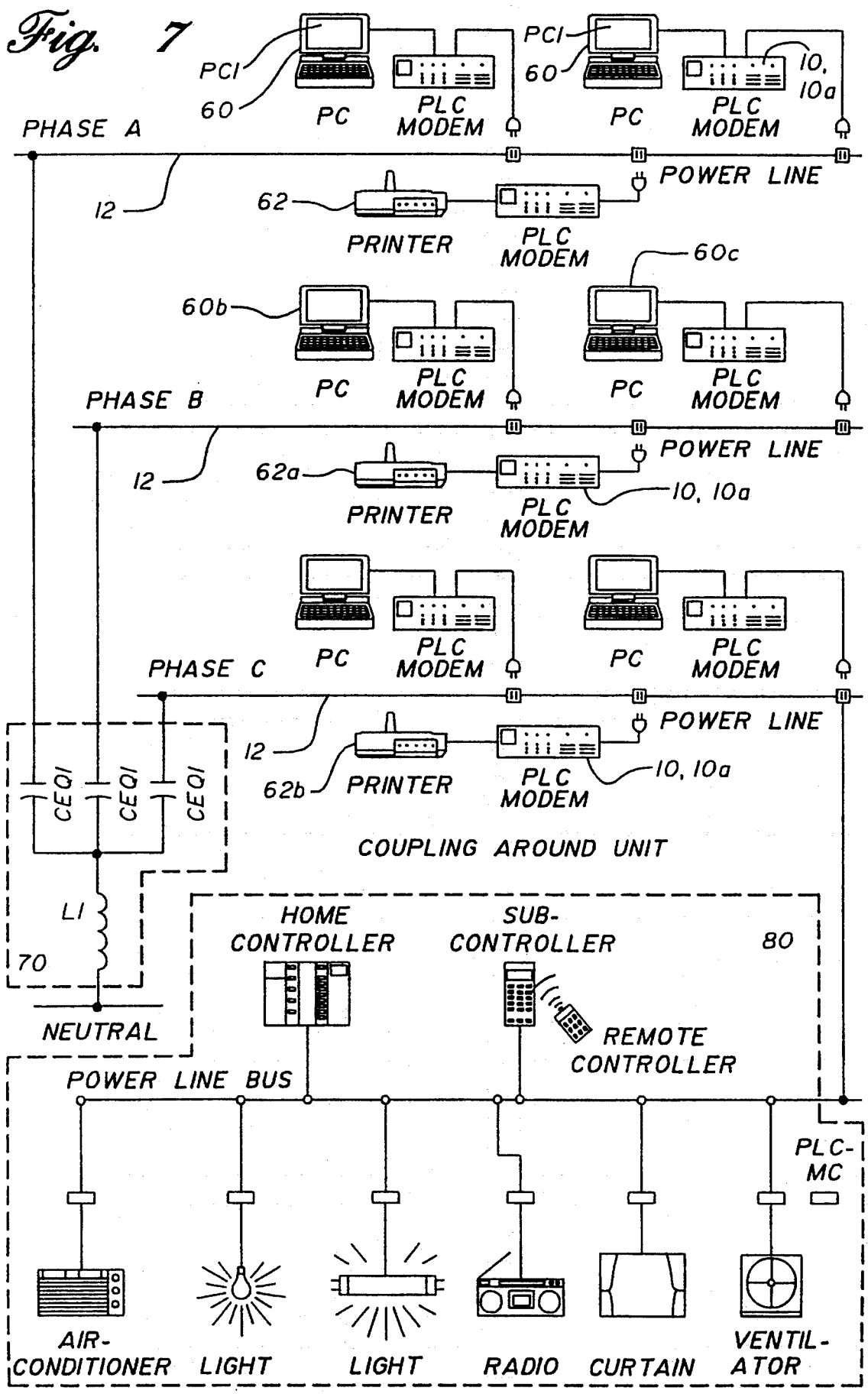
FIG. 7 depicts numerous computers, printers and various devices interconnected via the PLCM.

For example, referring to FIG. 7, PC1, a personal computer, may have a data stream port through which it sends and receives data. PC1 may send data to PC2 through the AC power line by first sending the data stream to a first PLCM which connects the data in a modulated format onto the AC power line. A second PLCM then can receive the modulated data, change it back into its original data stream form and connect it PC2 which, in turn, receives the data. Each transmission is addressable to preselect the destination.

Since the basic PLCM configuration is capable of handling a symbol rate of 80 KSymbols/sec per each input or output parallel line, the addition of another parallel line acts as a data speed multiplier increasing the baud rate and overall throughput of the PLCM. For example, if two modulators and demodulators are used in each PLCM the overall throughput of the PLCM is 80 KSymbols/sec$\times$2=160 KSymbols/sec. If eight modulators and demodulators are used in the PLCM the overall throughput of the PLCM is 80 KSymbols/sec parallel line$\times$4 parallel lines=320 Kbaud.

Figure 3:
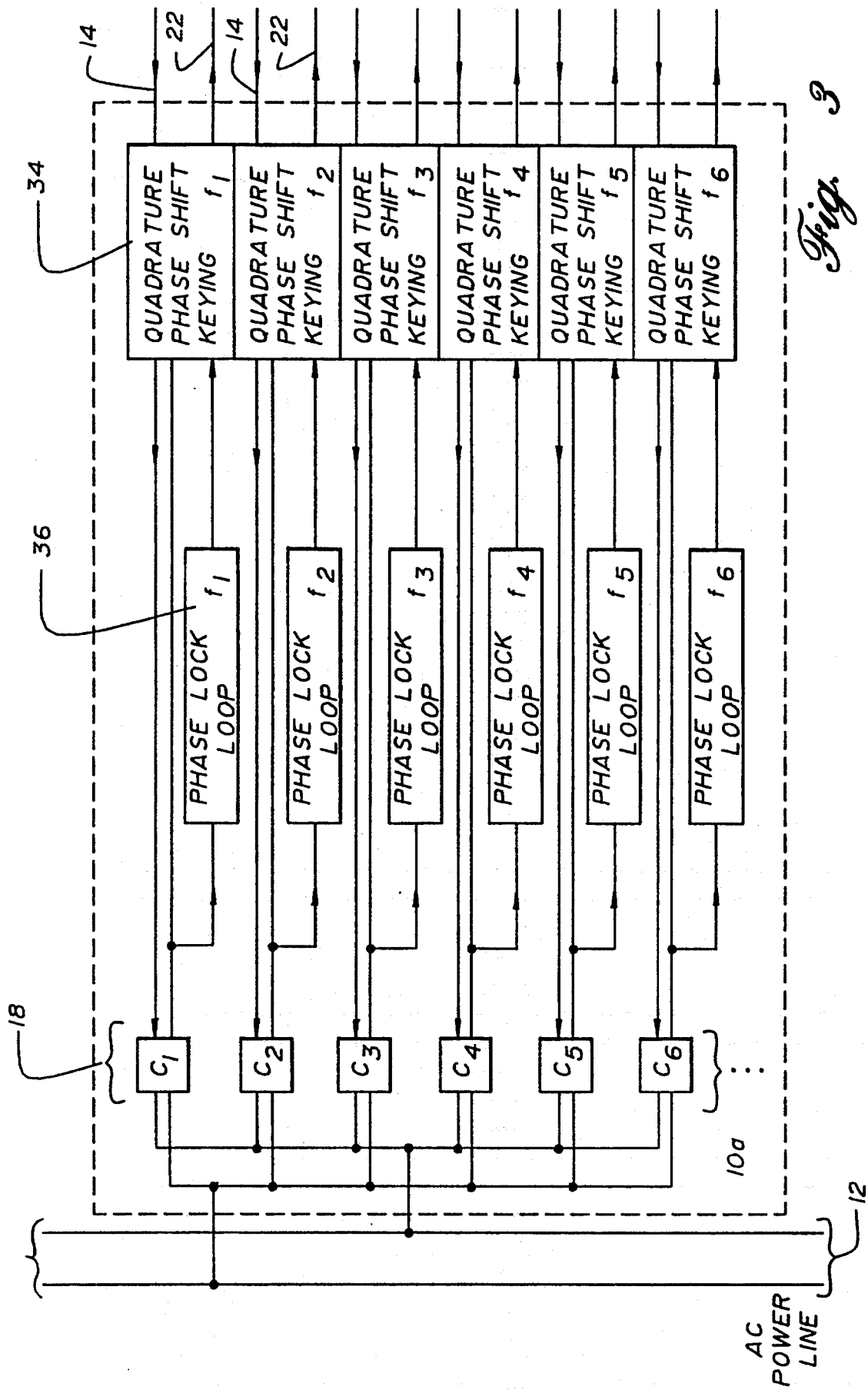
FIG. 3 is a block diagram of the PLCM incorporating quadrature phase shift keying in the modulation and demodulation stage.

Quadrature phase shift keying modulation techniques are illustrated in FIG. 3. As explained herein, quadrature phase shifting can be used successfully in the novel PLCM to double the baud rate of each input or output parallel line in the PLCM.

FIG. 3 depicts a phase shifting PLCM 10a with parallel input lines 14 which carry digital data into the quadrature phase shift keying (QPSK) modulator 34. The QPSK modulator assigns a 90, 180, 270 or 360 degree phase shift for each two bits of data and shifts the modulation frequency accordingly. For example, data bits "00" are assigned a 90 degree phase shift, "01" are assigned 180, "10" are assigned 270 degrees and "11" assigned a 360 degree shift. This technique essentially packs the data in a 2:1 ratio. Thus, the speed of each parallel input line is increased by a factor of two over the general modulation technique described in the basic PLCM.

The shifted modulation signal is coupled to the AC power line 12 by the PLCs 18. As with the basic PLCM all parallel shifted modulation signals are added together into a conglomerate modulation signal and sent over the AC power line to a second PLCM 10a. The second PLCM 10a (not shown) located at another point on the AC power line 12 receives the conglomerate modulation signal and separates and filters each distinct signal at the couplers 18.

Since the PLCs 18 are phase linear due to the use of air-core transformers and impedance matched to the AC power line at the modulation frequency, the encoded phase shifts are undisturbed when passing through them. Each shifted modulation signal proceeds to the phase lock loop (PLL) circuit 36. The PLL 36 assures the specific predetermined frequency and bandwidth are locked onto and do not drift prior to insertion into the QPSK demodulator 34. A possible bandwidth for the PLL is 50 KHz. Other frequency locking circuits can be used here as well.

At the QPSK demodulator the phase shifts in the modulated signals are demodulated (decoded) back into their original digital form. A 90 degree phase shift is demodulated into a "00" a 180 degree phase shift to a "01", and so forth. The data stream is then sent out on the associated parallel output data line. The data error rate of a communication apparatus having stations utilizing quadrature phase shift keying techniques is less than $10^{-9}$.

Figure 4:
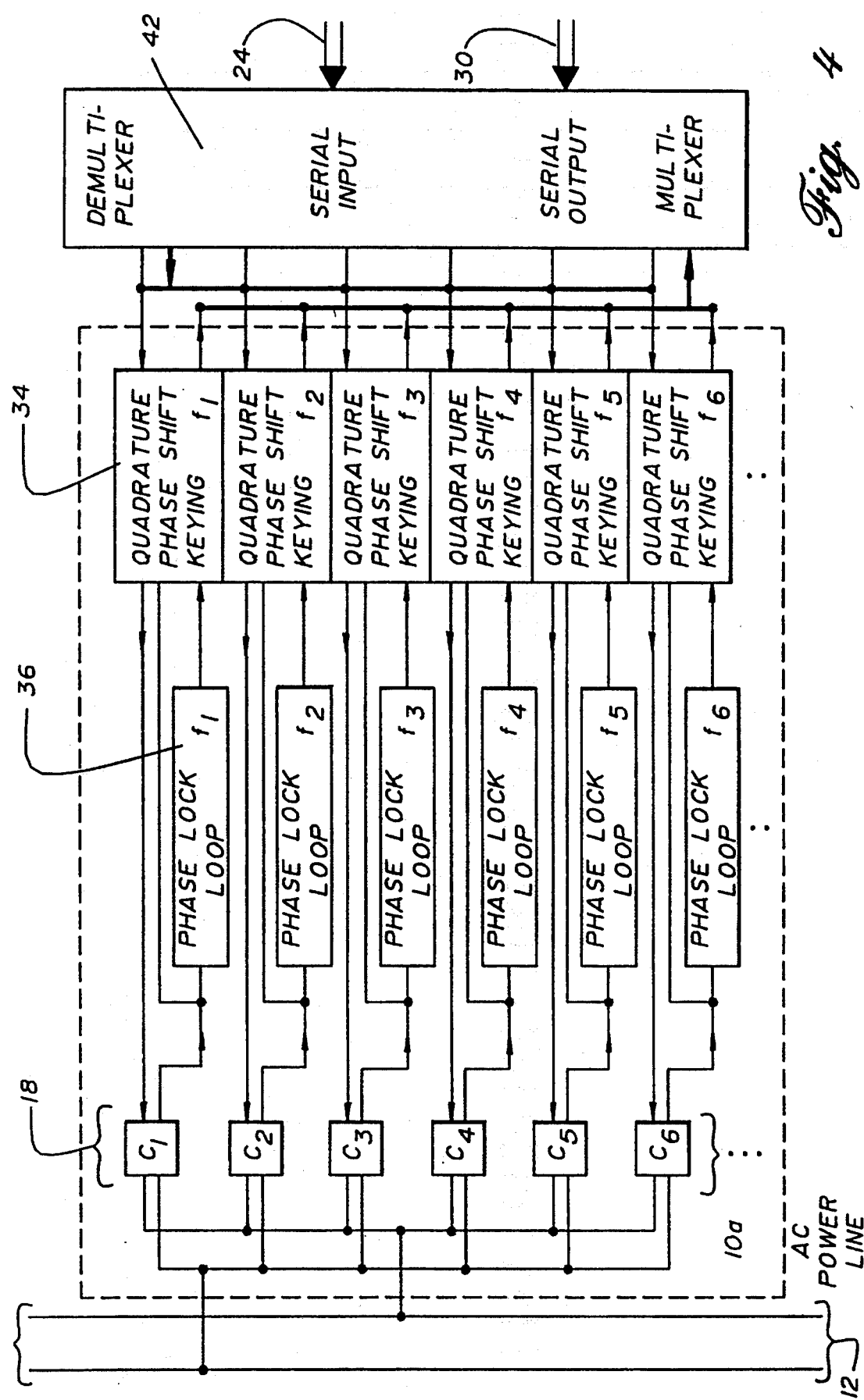
FIG. 4 is a block diagram of the PLCM incorporating quadrature phase shift keying and capable of handling high speed serial inputs and outputs.

FIG. 4, similar to FIG. 2, depicts how multiplexer and demultiplexer circuits can increase the baud rate of the phase shifting PLCM 10a to that of a high speed data stream input or output line. The multiplexer receives input data on the data stream input line then converts the data to multiplexed parallel data and connects the data to the parallel input lines. The data rate on each input parallel line is equal to the speed of the input data stream divided by the total number of parallel input lines. The more parallel input data lines the greater the speed of the data stream input lines that can be catered to by the PLCM. Using QPSK modulation each parallel input and output parallel data line operates at baud rates of about 160 kbaud. Therefore, if eight input and output data lines are used the overall throughput of the PLCM using quadrature phase shift keying is 160 Kbaud multiplied by four, totaling 640 Kbaud. The use of more than eight input and output data lines can increase the baud rate dramatically.

If an eight state phase shift modulator (octaphase shift key modulator) (OPSKM) is used instead of a quadrature phase shift modulator (four state modulator) then every three bits of data are assigned to each forty-five degree shift in phase. For example, "000" is assigned a 45 degree phase shift, "001" is assigned a 90 degree phase shift, "010" is assigned 135 degrees, "011" gets 180 degrees, "100 gets 225, "101" gets 270, "110" gets 315, and "111" gets a 360 degree phase shift assigned to it. This technique packs the data in a 3:1 ratio. Thus, the speed of each parallel input line is increased by a factor of 3 over the general input line. Using OPSK modulation and eight parallel input lines, each input line through put will be approximately 80 KSymbols/sec$\times$4 equaling 320 KSymbols/sec. Multiplying by eight lines the total throughput of a PLCM using OPSK modulation is about 2.5 MSymbols/sec.

The demultiplexer circuitry 26 operates the same way as described for FIG. 2. The parallel output lines 22, in FIG. 4, carry the digital data from the QPSK modulators 34 to the multiplexer where it is multiplexed from parallel to data stream data and sent out on the data screen output line 30.

For example, a Digital Signal Processing (DSP) chip can be used, using the ATT DSP 32C in which the digital bandpass filter, the PLL and the OPSK MOD/DEMOD can be programmed. The Carrier Sense Multiple Access/Collision Detection will be handled in the PLC modem. Logical separation of LAN traffic (addressability) may be used as well as the Forward Error Correction (FEC) and Data Compression, all of which are controlled by the CPU.

Obviously, the best carrier frequencies which can be chosen between the main harmonics of the 60 Hz, are every 30 KHz in the spectrum. In that case, the 1:1 received inband noise (threshold) is only around 5–15 mV peak to peak. Thus, ten channels can be used at the following carrier frequencies: F1=165 KHz, F2=195 KHz, F3=225 KHz, F4=255 KHz, F5=285 KHz, F6=315 KHz, F7=345 KHz, F8=375 KHz, F9=405 KHz, F10=435 KHz using about 20–24 KHz bandwidth for each channel and OPSK. Similarly, about 33.33 KSymbols/sec per channels and 1 Mbaud final speed can be reached. The usage of more channels will bring up the price of the modem and since the strong 60 Hz harmonics are only every 60 KHz in the spectrum, therefore only four channels are recommended at the following carrier frequencies, while the noise threshold remains about the same as above: F1=210 KHz, F2=270 KHz, F3=330 KHz, F4=390 KHz, using about 50–54 KHz bandwidth for each channels and OPSK. Similarly, about 83.33 KSymbols/sec per channels and 1 Mbaud final speed can be reached. It is also possible to add a fifth channel at 150 KHz. In Europe, the Power Line carrier frequency rules are different. They do not allow higher than 100 KHz frequency transmission, therefore four channels are recommended at the following carrier frequencies: F1=56K Hz, F2=69 KHz, F3=82 KHz, F4=95 KHz using about 9 KHz bandwidth for each channel and OPSK. The maximum final speed can be about 200 Kbaud. Since they have 50 Hz power, the strong harmonics appear at every 25 KHz in the spectrum, and the threshold is around 15–40 mV peak to peak.

Figure 5:
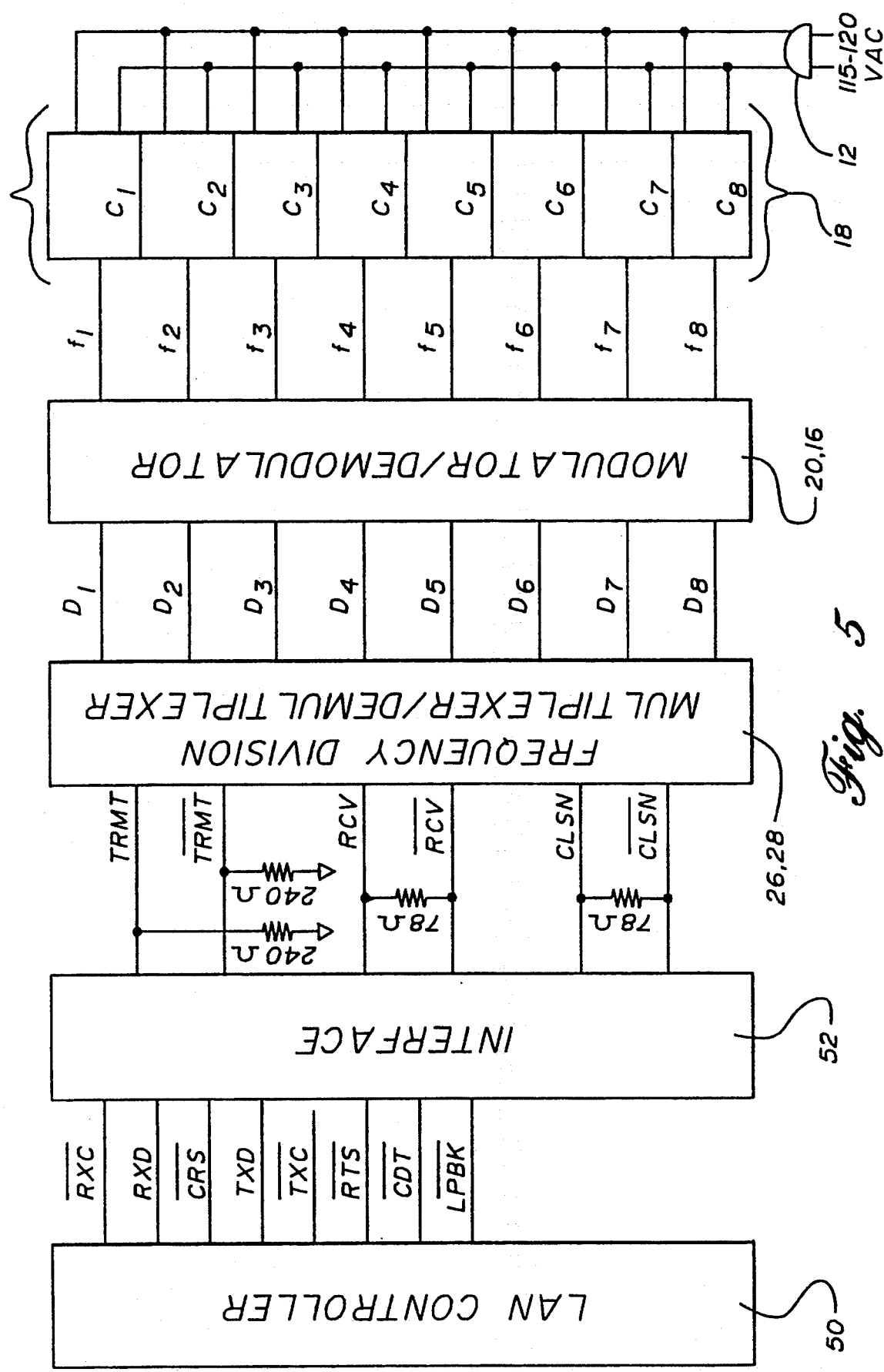
FIG. 5 is a block diagram of the PLCM configured to operate within a Local Area Network (LAN) system.
Figure 6:
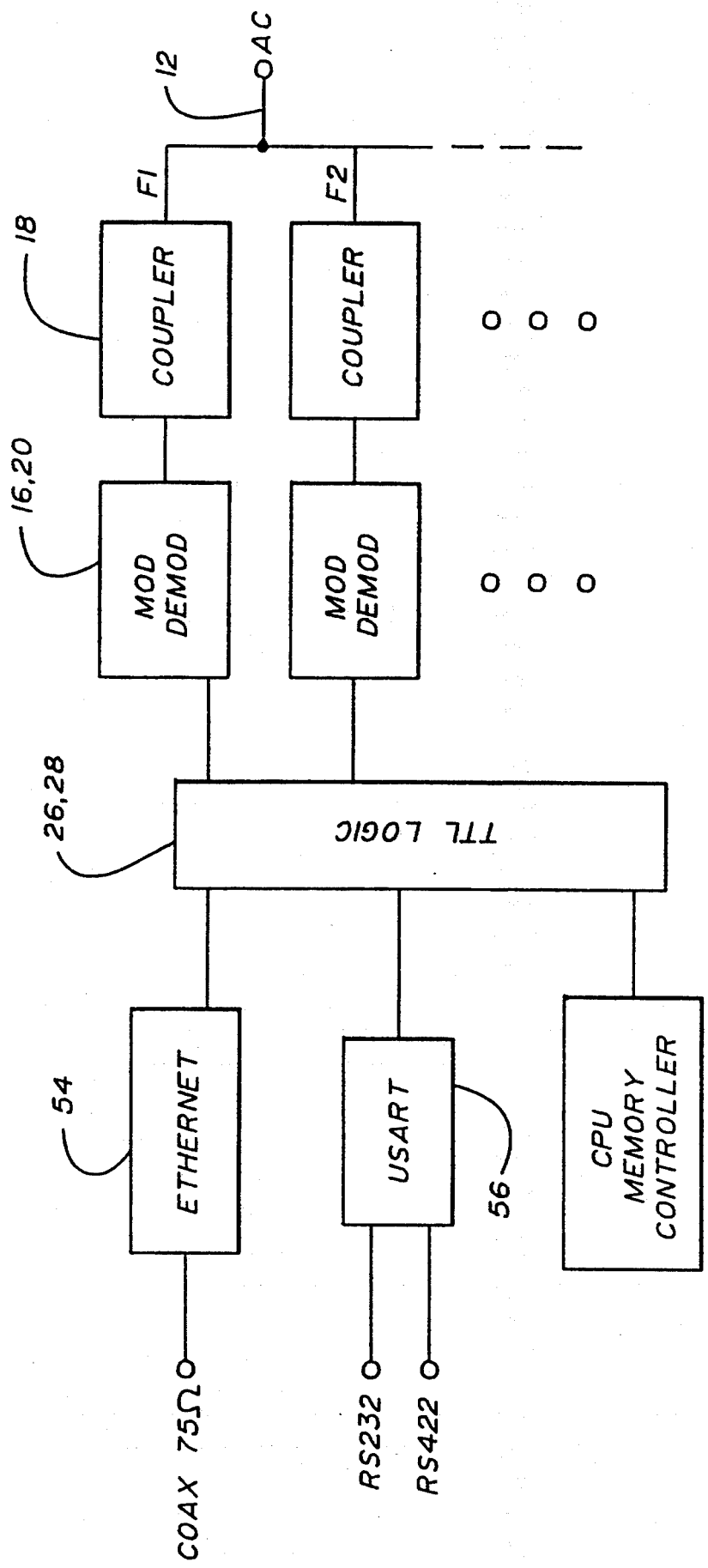
FIG. 6 is a block diagram of the PLCM configured to operate within an Ethernet.

FIG. 5 and FIG. 6 depict examples of how the PLCM and modulator/demodulator circuits can be used in coexistence with network controllers used in a Local Area Network (LAN) system, (FIG. 5), or other networking system, (FIG. 6). This is an inexpensive technique for creating or expanding a LAN or Ethernet System because no additional wiring must be added to interconnect the system. Other network controllers such as Starlan, Token Ring, etc. can also be used. Also, the use of various types of network software, such as Novell, can be implemented.

Power Line Couplers (PLC's), as described in my co-pending application Ser. No. 822,326 filed Jan. 17, 1992, are part of the present invention's embodiment because of their linear phase shifting qualities. PLC's allow signal information to be placed on conventional electrical wiring and retrieved, noise free, at another position. PLC's allow communication over existing electrical power AC wiring found in buildings. PLC's also allow for communication over long distance through power lines outside buildings. Such a configuration on outside wiring will allow efficient data communication from building to building without the installation of new cabling. With a PLCM, which incorporates a PLC, existing electrical wiring in any form can become a means for transmitting and receiving communications at rates of speed that can exceed 1 Mbaud.

FIG. 7 depicts a possible configuration for data communication between multiple microprocessor based and electrical/electronic equipment. Any personal computer (PC), printer, or other device can be connected to a PLCM 10, 10a. The PLCM, plugged into a standard wall socket, will allow the device to transmit and/or receive communication information over the electrical wiring of the building 12.

Note that if multiple phases are present (phase A, B, & C) and devices which must communicate via a PLCM are connected to separate phases, then a simple circuit 70 can be used to link the phases together.

While particular embodiments of the present invention are disclosed herein, it is not intended to limit the invention to such disclosure, and changes and modifications may be incorporated and embodied within the scope of the following claims.

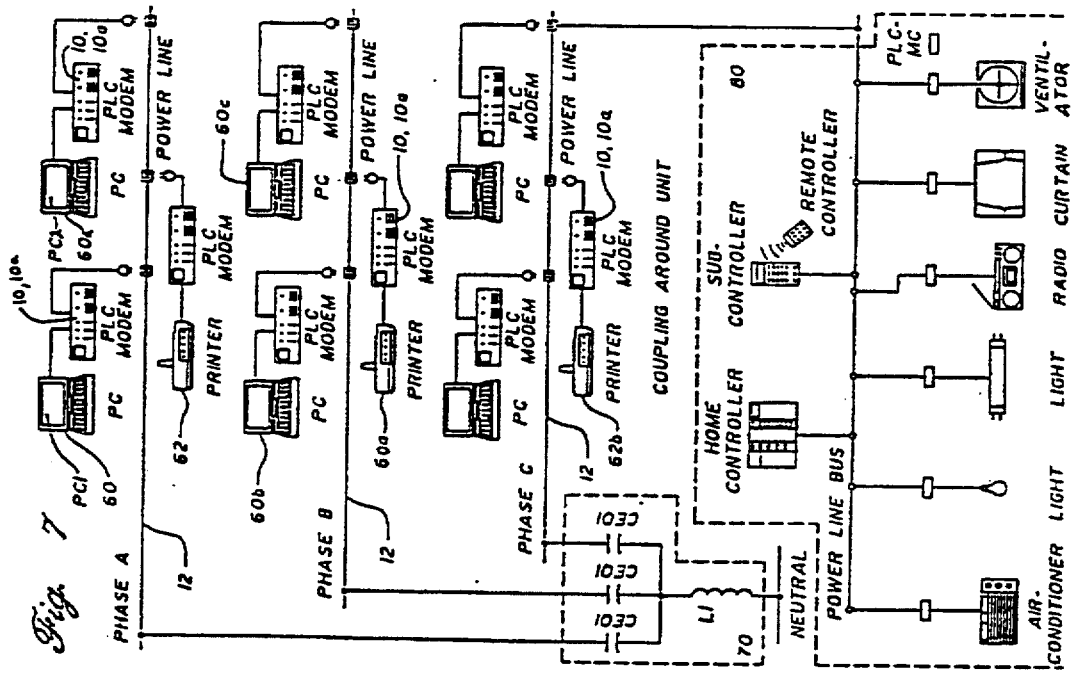

What is claimed is:

1. A communication apparatus which transmits and receives multiple modulated signals over an electrical line which comprises:
   a first station and a second station;
   said first station capable of receiving high speed data and converting the high speed data into multiple modulated signals for sending simultaneously over the electrical line to said second station, said second station being capable of simultaneously demodulating the multiple modulated signals and converting the signals back into high speed data; and
   each said station incorporating dielectric core couplers for coupling the multiple modulated signals between the electrical line and each station.

2. A communication apparatus in accordance with claim 1 wherein the dielectric-core couplers couple the multiple modulated signals between the electrical line and each station in a phase linear manner.

3. A communication apparatus in accordance with claim 1 wherein the electrical line is any conventional wiring.

4. A communication apparatus in accordance with claim 1 wherein the multiple modulated signal sent over the electrical line can be set for a distance of less than 3 km.

5. A communication apparatus in accordance with claim 1 wherein the multiple modulating signal is a combination of multiplexed digital data which is modulated at different distinct preselected frequencies and then combined.

6. A communication apparatus in accordance with claim 1 wherein the high speed data is serial data traveling at a rate of up to 100 KSymbols/sec.

7. A communication apparatus in accordance with claim 1 wherein each station utilizes quadrature phase shift keying techniques when modulating and demodulating the multiple modulated signals.

8. A communication apparatus in accordance with claim 6 wherein the high speed data is serial data traveling at a rate of at least 160 kbits/sec.

9. A communication apparatus in accordance with claim 1 wherein each station utilizes octaphase shift keying techniques.

10. A communication apparatus in accordance with claim 7 wherein the data error rate of the communication apparatus is less than $10^{-9}$.

11. A communication apparatus which transmits and receives composite modulated signals over an electrical line at high speeds comprising:

a first station and a second station connected to each other by an electrical line;

each station including multiple input data lines, multiple output data lines, multiple modulators, multiple demodulators and multiple air-core couplers;

said multiple input data lines carrying electrical information signals to said modulators, with one input data line associated with each of said modulators;

each of said modulators operating at a different preselected modulation frequency, and modulating electrical information signals received from its associated input data line and passing modulated electrical information signals to one of said air-core couplers;

each of said air-core couplers, being phase-shift linear and impedance matched with the electrical line at a preselected modulation frequency, coupling each modulated electrical information signal to the electrical line to create a composite output signal;

each of said air-core couplers also receiving a composite input signal from the electrical line and separating the composite input signal into parallel input modulation signals, without affecting the phase of said parallel input modulation signals, and passing said parallel input modulation signals to said demodulators;

each of said demodulators, one for each input modulation signal, demodulating one of said input modulation signals and transmitting a demodulated input modulation signal on one of said output data lines as input data.

12. A communication apparatus in accordance with claim 11 wherein all said input data lines are connected to a demultiplexer which demultiplexes the electrical information on an input data stream line onto said input data lines, and all said output data lines are connected to a multiplexer which multiplexes the electrical information on said output data lines onto an output data stream line.

13. A communication apparatus in accordance with claim 12 wherein the input data lines and the output data lines operate individually at approximately 80 KSymbols/sec multiplied by the number of input data lines and the output data lines, respectively.

14. A communication apparatus in accordance with claim 11 wherein each of the air-core couplers has a dielectric core.

15. A communication apparatus in accordance with claim 11 wherein the electrical information on the input data lines and the output data lines is analog information.

16. A communication apparatus in accordance with claim 12 wherein the demodulators incorporate phase-lock-loop circuity prior to demodulation.

17. A communication apparatus in accordance with claim 16 wherein the modulators and the demodulators incorporate Quadrature Phase Shift Keying Circuitry.

18. A communication apparatus in accordance with claim 16 wherein the modulators and the demodulators incorporate octaphase shift keying circuitry.

19. A communication apparatus in accordance with claim 11 wherein each said station includes a multiplexer, demultiplexer, a serial input line and a serial output line;

each serial input line carries input data to a demultiplexer;

said demultiplexer demultiplexes the input data on the serial input line onto the multiple input data lines;

each multiplexer receives output data from the output data lines and multiplexes the data into data stream output data and sends the output data on the serial output line.

20. A communication apparatus in accordance with claim 17 wherein both the data on the serial input line and data on the serial output line travel at data speeds exceeding approximately 1 Mbaud.

21. A method of communication which allows multiple electronic processors to communicate on an electrical line comprising the steps of:

providing a first encoder/decoder unit connected to a first electronic processor and at least a second encoder/decoder unit connected to a second electronic processor, both first and second encoder/decoder units being connected to said electrical line and utilizing air-core couplers;

receiving a first data stream from the first electronic processor;

multiplexing the first data stream into multiple parallel data streams;

modulating each parallel data stream at a different distinct preselected modulation frequency resulting in multiple modulated data streams;

combining the multiple modulated data streams into a combination data stream;

sending the combination data stream on the electrical line in a phase linear manner;

receiving the combination data stream at the second encoder/decoder unit;

separating the combination data stream, in a phase linear manner, into second multiple modulated data streams each modulating at a different distinct modulation frequency;

demodulating each of said second modulated data streams and creating second parallel data streams;

demultiplexing the second parallel data streams into a single second data stream;

transmitting said second data stream to the second electronic processor.

22. Communication apparatus comprising:

an electrical line over which first composite modulated information signals and second composite modulated information signals are transmitted;

a first station connected to said electrical line for:
  (a) developing said first composite modulated information signals,
  (b) conducting to said electrical line said first composite modulated information signals,
  (c) receiving from said electrical line said second composite modulated information signals, and
  (d) processing said second composite modulated information signals, said first station including:
  (a) a plurality of first station input data lines carrying first electrical information signals,
  (b) a plurality of first station modulators, each one associated with one of said first station input data lines and operating at a different preselected modulation frequency, for modulating said first electrical information signals received from associated first station input data lines to develop components of said first composite modulated information signals,
  (c) a plurality of first station demodulators, each one operating at a different preselected demodulation frequency, for demodulating components of said second composite modulated information signals received from said electrical line, (d) a plurality of first station output data lines, each one associated with one of said first station demodulators for carrying second electrical information signals, (e) a plurality of phase-shift linear first station air-core couplers impedance matched with said electrical line for:

(i) coupling said components of said first composite modulated information signals developed by said first station modulators to said electrical line, (ii) separating said components of said second composite modulated information signals without affecting the phase of said components of said second composite modulated information signals, and (iii) passing said components of said second composite modulated information signals in parallel to said first station demodulators;

and a second station connected to said electrical line for:

(a) developing said second composite modulated information signals, (b) conducting to said electrical line said second composite modulated information signals, (c) receiving from said electrical line said first composite modulated information signals, and (d) processing said first composite modulated information signals, said second station including:

(a) a plurality of second station input data lines carrying said second electrical information signals, (b) a plurality of second station modulators, each one associated with one of said second station input data lines and operating at a different preselected modulation frequency, for modulating said second electrical information signals received from associated second station input data lines to develop components of said second composite modulated information signals, (c) a plurality of second station demodulators, each one operating at a different preselected demodulation frequency, for demodulating components of said first composite modulated information signals received from said electrical line, (d) a plurality of second station output data lines, each one associated with one of said second station demodulators for carrying said first electrical information signals, (e) a plurality of phase-shift linear second station air-core couplers impedance matched with said electrical line for:

(i) coupling said components of said second composite modulated information signals developed by said second station modulators to said electrical line, (ii) separating components of said first composite modulated information signals without affecting the phase of said components of said first composite modulated information signal, and (iii) passing said components of said first composite modulated information signals in parallel to said second station demodulators.

23. Communication transmitting apparatus for transmitting composite modulated information signals over an electrical line comprising:

a transmitting station connected to said electrical line for:

(a) developing said composite modulated information signals, (b) conducting to said electrical line said composite modulated information signals, said transmitting station including:

(a) a plurality of transmitting station input data lines carrying first electrical information signals, (b) a plurality of transmitting station modulators, each one associated with one of said transmitting station input data lines and operating at a different preselected modulation frequency, for modulating said first electrical information signals received from associated transmitting station input data lines to develop components of said composite modulated information signals, (c) a plurality of phase-shift linear first station air-core couplers impedance matched with said electrical line for coupling said components of said composite modulated information signals developed by said transmitting station modulators to said electrical line.

24. Communications apparatus in accordance with claim 23 further comprising a receiving station for receiving said composite modulated signal.

25. Communication apparatus in accordance with claim 24 wherein said receiving station comprises air-core couplers impedance matched to said electrical line.

26. Communication receiving apparatus for receiving composite modulated information signals over an electrical line comprising:

a receiving station connected to said electrical line for:

(a) receiving from said electrical line said composite modulated information signals, and (b) processing said composite modulated information signals, said receiving station including:

(a) a plurality of receiving station demodulators, each one operating at a different preselected demodulation frequency, for demodulating components of said composite modulated information signals received from said electrical line, (b) a plurality of receiving station output data lines, each one associated with one of said receiving station demodulators for carrying second electrical information signals, and (c) a plurality of phase-shift linear first station air-core couplers impedance matched with said electrical line for:

(i) separating said components of said composite modulated information signals without affecting the phase of said components of said composite modulated information signals, and (ii) passing said components of said composite modulated information signals in parallel to said receiving station demodulators.

27. Communication apparatus in accordance with claim 26 further comprising a transmitting station for transmitting said composite modulated signal.

28. Communication apparatus in accordance with claim 27 wherein said transmitting station comprises air-core couplers impedance matched to said electrical line.

29. Communication transceiver apparatus for transmitting and receiving first and second composite modulated information signals over an electrical line comprising:

a transceiver station connected to said electrical line for:
 (a) developing said first composite modulated information signals,
 (b) conducting to said electrical line said first composite modulated information signals,
 (c) receiving from said electrical line said second composite modulated information signals, and
 (d) processing said second composite modulated information signals, said transceiver station including:
 (a) a plurality of input data lines carrying first electrical information signals,
 (b) a plurality of modulators, each one associated with one of said input data lines and operating at a different preselected modulation frequency, for modulating said first electrical information signals received from associated input data lines to develop components of said first composite modulated information signals,
 (c) a plurality of demodulators, each one operating at a different preselected demodulation frequency, for demodulating components of said second composite modulated information signals received from said electrical line,
 (d) a plurality of output data lines, each one associated with one of said demodulators for carrying second electrical information signals,
 (e) a plurality of phase-shift linear first station air-core couplers impedance matched with said electrical line for:
  (i) coupling said components of said first composite modulated information signals developed by said transceiver station modulators to said electrical line,
  (ii) separating said components of said second composite modulated information signals without affecting the phase of said components of said second composite modulated information signals, and
  (iii) passing said components of said second composite modulated information signals in parallel to said demodulators.

30. Communication apparatus in accordance with claim 29 further comprising a second transceiver station connected to said electrical line for sending said second composite modulated signals over said electrical line and receiving said first composite modulated signals over said electrical line.

31. The communication apparatus of claim 30 wherein said second transceiver comprises air-core couplers impedance matched to said electrical line.

* * * * *

UNITED STATES PATENT AND TRADEMARK OFFICE
CERTIFICATE OF CORRECTION

PATENT NO. : 5,351,272
DATED : September 27, 1994
INVENTOR(S) : Karoly Charles Abraham It is certified that error appears in the above-indentified patent and that said Letters Patent is hereby corrected as shown below:

The title page, should be deleted to appear as per attached title page.

Signed and Sealed this

Ninth Day of May, 1995

Attest:

BRUCE LEHMAN

Attesting Officer

Commissioner of Patents and Trademarks

United States Patent [19]

Abraham

[11] Patent Number: 5,351,272
[45] Date of Patent: Sep. 27, 1994

[54] COMMUNICATIONS APPARATUS AND METHOD FOR TRANSMITTING AND RECEIVING MULTIPLE MODULATED SIGNALS OVER ELECTRICAL LINES

[76] Inventor: Karoly C. Abraham, 506 S. 41st St., Apartment 3E, Philadelphia, Pa. 19104

[21] Appl. No.: 884,123

[22] Filed: May 18, 1992

[51] Int. Cl.$^5$ .................. H04K 1/10; H04L 27/28; H04M 11/04
[52] U.S. Cl. ..................... 375/38; 340/310 A; 340/310 R
[58] Field of Search ............... 340/310 R, 310 A, 825, 340/58, 310 CP; 375/7, 8, 9, 52, 53, 54, 83, 85, 37, 38, 39; 455/14

[56] References Cited

U.S. PATENT DOCUMENTS

| | | |
|---|---|---|
| 2,125,119 | 7/1938 | Lyman . |
| 4,004,110 | 1/1977 | Whyte . |
| 4,142,178 | 2/1979 | Whyte . |
| 4,254,402 | 3/1981 | Perkins . |
| 4,355,303 | 10/1982 | Phillips et al. ............ 340/310 A |
| 4,419,758 | 12/1983 | Dorey ........................ 375/38 |
| 4,675,648 | 6/1987 | Roth et al. . |
| 4,800,363 | 1/1989 | Braun et al. . |
| 4,815,106 | 3/1989 | Propp et al. ............ 340/310 R |
| 4,845,466 | 7/1989 | Hariton et al. . |
| 4,885,563 | 12/1989 | Johnson et al. . |
| 4,903,006 | 2/1990 | Boomgaard . |
| 5,185,591 | 2/1993 | Shuey ........................ 340/310 R |

OTHER PUBLICATIONS

J. Bingham, "Multicarrier Modulation for Data Transmission: An Idea Whose Time has Come," IEEE Communications Magazine, May 1990, pp. 5–14.

Keith Nichols, "Build a Pair of Line-Carrier Modems," Radio Electronics, pp. 87–91 (Jul. 1988).

J. Gohari, "Power-Line Carrier," Fundamental Handbook of Electrical and Computer Engineering, vol. II: Communications Control Devices and Systems, pp. 617–627 (1983).

Primary Examiner—Stephen Chin
Assistant Examiner—Duane Kobayashi
Attorney, Agent, or Firm—Ratner & Prestia

[57] ABSTRACT

The present invention discloses an improved electrical communication apparatus which communicates high speed data/information over existing AC wiring, provides a phase linear environment for electrical transmission and reception of information on electrical wiring and provides a means for simultaneous transmission and reception of multiple data/information streams via the use of dielectric core couplers. This invention provides a means for linking 2 or more microprocessor based or electronic devices via conventional electric lines such as power lines, building wiring, twisted pair, coaxial cable or other wiring.

31 Claims, 8 Drawing Sheets

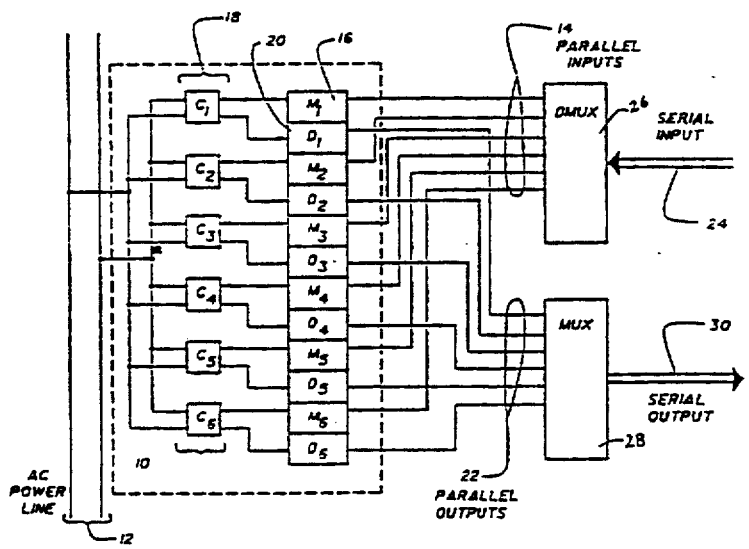

UNITED STATES PATENT AND TRADEMARK OFFICE
CERTIFICATE OF CORRECTION

PATENT NO.   : 5,351,272
DATED        : September 27, 1994
INVENTOR(S)  : Karoly Charles Abraham It is certified that error appears in the above-identified patent and that said Letters Patent is hereby corrected as shown below:

In Figure 2,

Serial output 30 should be redrawn as an output; and reference character 26 should be applied to the DMOX and 28 should be applied to the MUX.

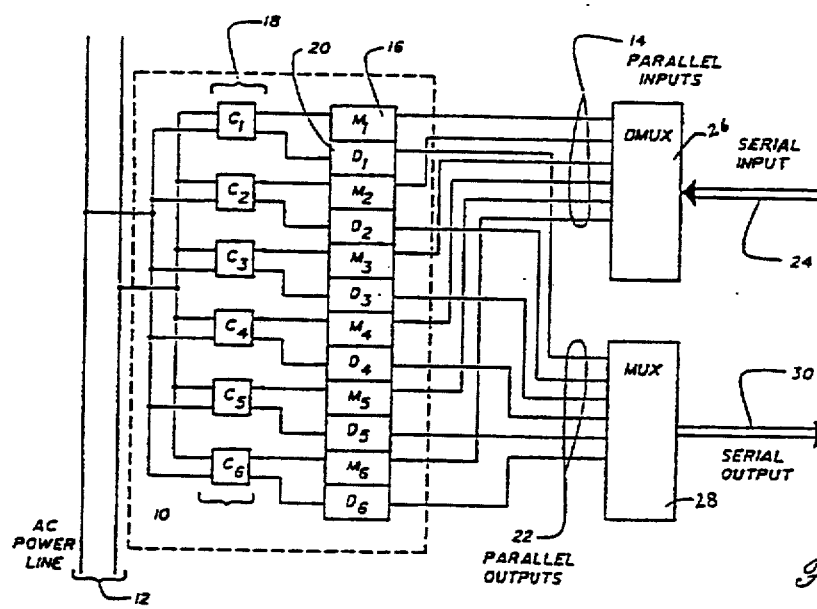

Fig. 2

UNITED STATES PATENT AND TRADEMARK OFFICE
CERTIFICATE OF CORRECTION

PATENT NO.    : 5,351,272
DATED         : September 27, 1994
INVENTOR(S)   : Karoly Charles Abraham It is certified that error appears in the above-identified patent and that said Letters Patent is hereby corrected as shown below:

In Figure 3,

> The text "COUPLERS" should be inserted under reference character 18.

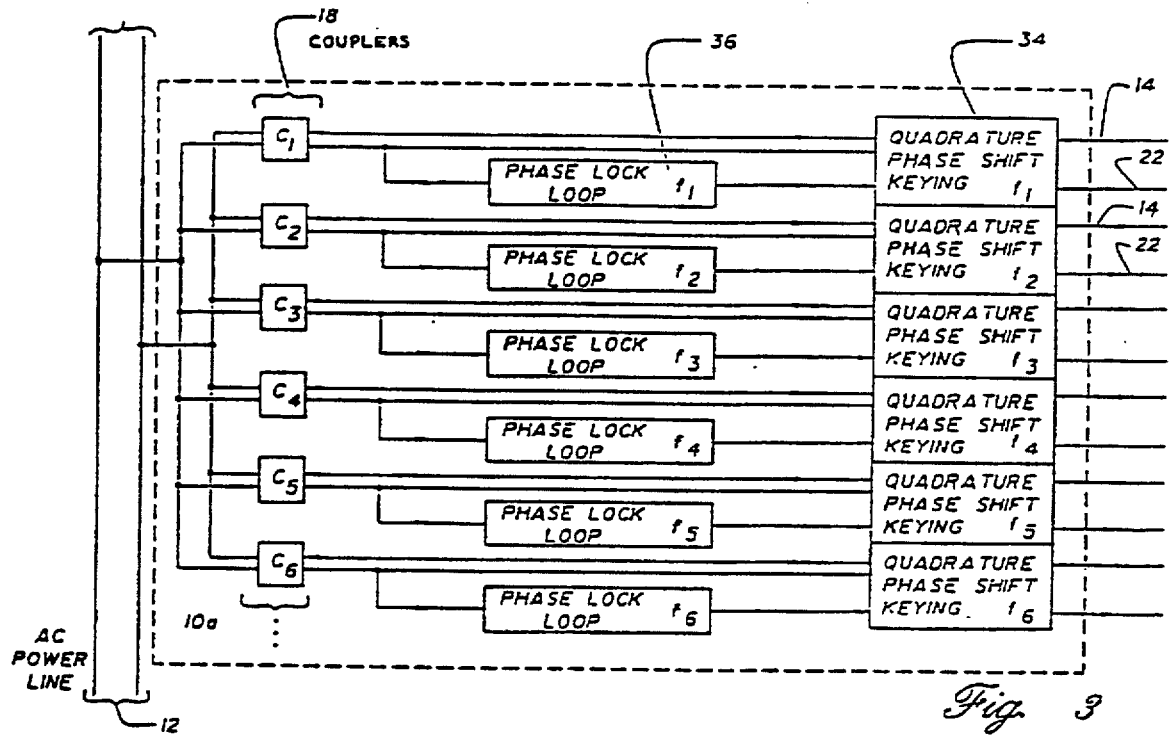

Fig. 3

UNITED STATES PATENT AND TRADEMARK OFFICE
CERTIFICATE OF CORRECTION

PATENT NO.    : 5,351,272
DATED         : September 27, 1994
INVENTOR(S)   : Karoly Charles Abraham It is certified that error appears in the above-identified patent and that said Letters Patent is hereby corrected as shown below:

In Figure 4,

Serial output 30 should be redrawn as an output;

The text "COUPLERS" should be inserted under reference character 18, "(26,28)", and "SEE FIGURE 2" should be inserted under reference character 42, "INPUT DATA STREAM" should be inserted under reference character 24 and "OUTPUT DATA STREAM" should be inserted under reference character 30;

The lead lines from demultiplexer 42 to modulator 34, other than the input/output arrows, should be deleted.

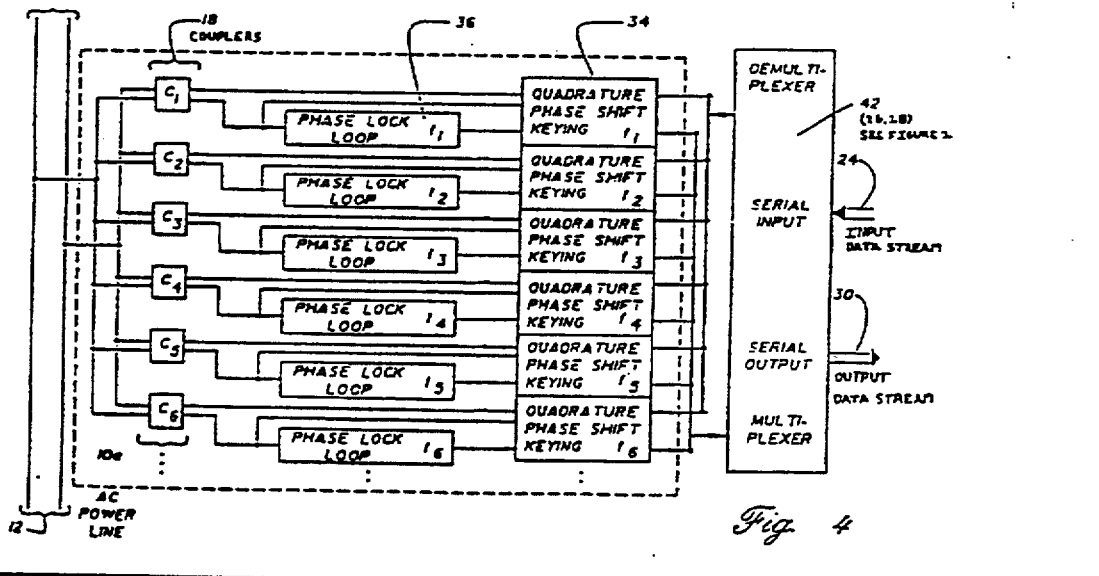

Fig. 4

UNITED STATES PATENT AND TRADEMARK OFFICE
CERTIFICATE OF CORRECTION

PATENT NO.    : 5,351,272
DATED         : September 27, 1994
INVENTOR(S)   : Karoly Charles Abraham It is certified that error appears in the above-identified patent and that said Letters Patent is hereby corrected as shown below:

In Figure 5,

The text "COUPLERS" should be inserted under reference character 18.

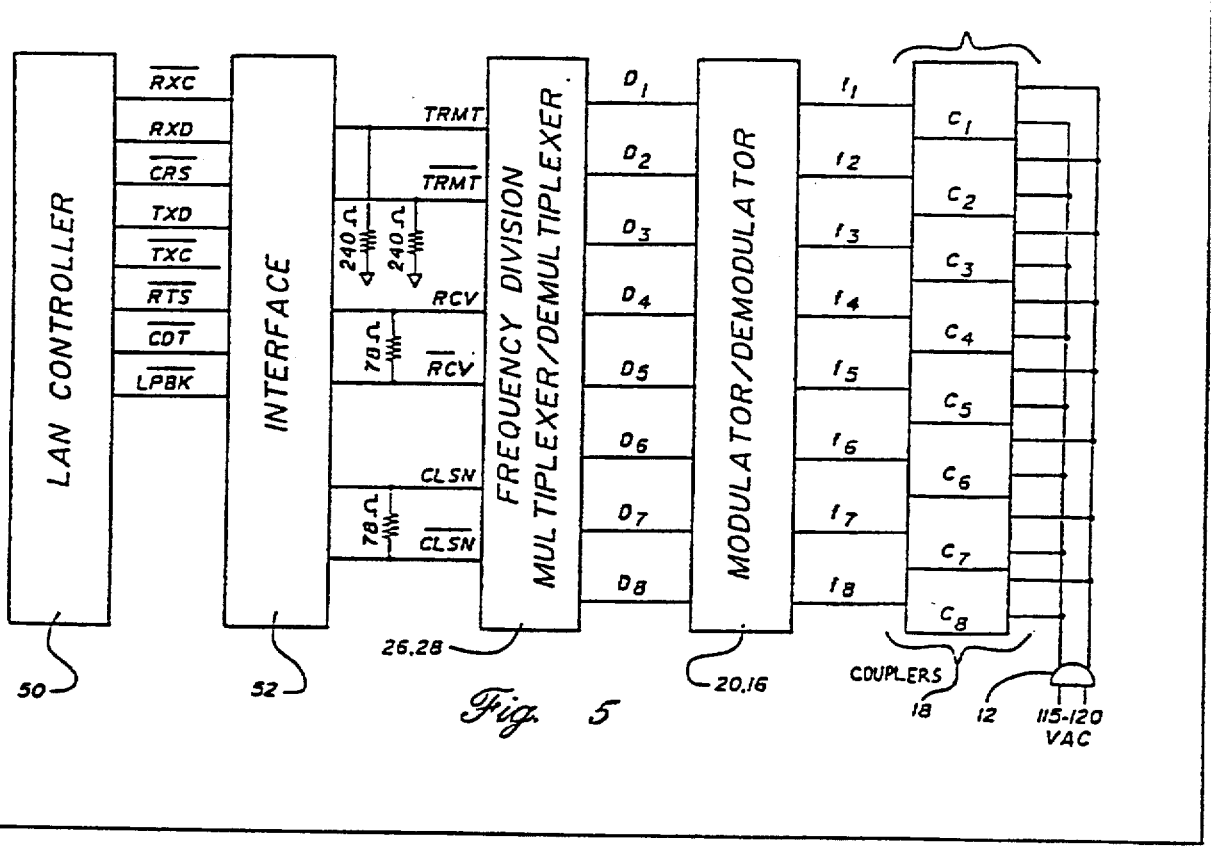

Fig. 5

UNITED STATES PATENT AND TRADEMARK OFFICE
CERTIFICATE OF CORRECTION

PATENT NO.    : 5,351,272
DATED         : September 27, 1994
INVENTOR(S)   : Karoly Charles Abraham It is certified that error appears in the above-identified patent and that said Letters Patent is hereby corrected as shown below:

In Figure 7,

Reference characters 10, 10a should be applied to the PLC modem connected to PC 60 at the top left of Figure 7;

"PC1" at the top right of Figure 7 should be changed to "PC2"; and reference character "60" for "PC2" should be changed to "60a".